(12) United States Patent
Lee et al.

(10) Patent No.: US 8,920,987 B2
(45) Date of Patent: Dec. 30, 2014

(54) FUEL CELL SYSTEM WITH IMPROVED HUMIDIFICATION PERFORMANCE

(75) Inventors: Dong Hun Lee, Gyeonggi-do (KR); Seo Ho Choi, Seoul (KR); Woo Suk Sung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1080 days.

(21) Appl. No.: 12/617,194

(22) Filed: Nov. 12, 2009

(65) Prior Publication Data

US 2011/0053012 A1     Mar. 3, 2011

(30) Foreign Application Priority Data

Aug. 26, 2009  (KR) .......................... 10-2009-0079483

(51) Int. Cl.
*H01M 8/06*      (2006.01)
*H01M 8/04*      (2006.01)
*H01M 8/10*      (2006.01)

(52) U.S. Cl.
CPC ........ *H01M 8/0435* (2013.01); *H01M 8/04007* (2013.01); *H01M 8/04097* (2013.01); *H01M 8/04141* (2013.01); *H01M 8/04358* (2013.01); *H01M 8/04768* (2013.01); *H01M 2008/1095* (2013.01); *Y02E 60/50* (2013.01)
USPC .......................................... 429/413; 429/408

(58) Field of Classification Search
USPC ....................................................... 429/429
See application file for complete search history.

(56) References Cited

U.S. PATENT DOCUMENTS

| | | | |
|---|---|---|---|
| 6,777,121 B1 * | 8/2004 | Shimanuki et al. | ........... 429/431 |
| 2009/0004517 A1 * | 1/2009 | Nagasaki et al. | ............... 429/23 |

FOREIGN PATENT DOCUMENTS

| | | | |
|---|---|---|---|
| JP | 06-089731 A | | 3/1994 |
| JP | 2002-216816 A | | 8/2002 |
| JP | 2004-178900 | * | 11/2002 |
| JP | 2004-178900 A | | 6/2004 |
| JP | 2005-276547 A | | 10/2005 |
| JP | 2005-302442 A | | 10/2005 |
| JP | 2005-340006 A | | 12/2005 |
| JP | 2006-139998 A | | 6/2006 |
| JP | 2006-236758 A | | 9/2006 |
| JP | 2006-278209 A | | 10/2006 |
| JP | 2008-47444 | | 2/2008 |
| JP | 2008-053144 A | | 3/2008 |
| JP | 2009-152013 | * | 7/2009 |
| JP | 2009-152013 A | | 7/2009 |

* cited by examiner

*Primary Examiner* — Ula C. Ruddock
*Assistant Examiner* — Jacob Marks
(74) *Attorney, Agent, or Firm* — Edwards Wildman Palmer LLP; Peter F. Corless (57) ABSTRACT

The present invention provides a fuel cell system, which reduces the temperature of exhaust gas discharged from a fuel cell stack to a humidifier to increase the humidity thereof when the fuel cell stack operates at high temperature and high power, and thus improves the humidification performance for air as an oxidant in the humidifier and improves the performance of the fuel cell stack.

For this purpose, the present invention provides a fuel cell system in which an intercooler is installed in an exhaust gas pipe, which connects a cathode outlet of the fuel cell stack and the humidifier, to cool the exhaust gas as a water supply source of the humidifier such that the intercooler reduces the temperature of the exhaust gas and, at the same time, increase the humidity thereof, thus improving humidification performance for air as an oxidant in the humidifier.

7 Claims, 11 Drawing Sheets

FUEL CELL SYSTEM WITH IMPROVED HUMIDIFICATION PERFORMANCE

CROSS-REFERENCE TO RELATED APPLICATION

This application claims under 35 U.S.C. §119(a) the benefit of Korean Patent Application No. 10-2009-0079483 filed Aug. 26, 2009, the entire contents of which are incorporated herein by reference.

BACKGROUND

(a) Technical Field

The present disclosure relates, generally, to a fuel cell system. More particularly, it relates to a fuel cell system, which can suitably improve humidification performance for reactant gases supplied to a fuel cell stack, thus suitably improving the performance of the fuel cell stack.

In general, a fuel cell system is an electricity generation system that does not convert chemical energy of fuel into heat by combustion, but electrochemically converts the chemical energy into electrical energy in a fuel cell stack. Such a fuel cell system can be applied to the supply of electric power for small-sized electrical/electronic devices, for example, portable devices, as well as to the supply of electric power for industrial and household appliances and for vehicles.

Among the most attractive fuel cells for a vehicle is a polymer electrolyte membrane fuel cell (PEMFC), which has been extensively studied as a power supply source for driving a vehicle. Preferably, the fuel cell stack included in the PEMFC comprises a membrane electrode assembly (MEA), a gas diffusion layer (GDL), a gasket, a sealing member, and a bipolar plate (separator). Preferably, the MEA includes a polymer electrolyte membrane through which hydrogen ions are transported. An electrode/catalyst layer, in which an electrochemical reaction takes place, is suitably disposed on each of both sides of the polymer electrolyte membrane. The GDL functions to uniformly suitably diffuse reactant gases and transmit generated electricity. The gasket functions to suitably provide an appropriate airtightness to reactant gases and coolant. The sealing member functions to suitably provide an appropriate bonding pressure. The bipolar plate functions to suitably support the MEA and GDL, collect and transmit generated electricity, transmit reactant gases, transmit and remove reaction products, and transmit coolant to remove reaction heat, etc.

The fuel cell stack consists of a plurality of unit cells, each unit cell preferably including an anode, a cathode, and an electrolyte (electrolyte membrane). Hydrogen as a fuel is suitably supplied to the anode ("fuel electrode", "hydrogen electrode", or "oxidation electrode") and oxygen containing air as an oxidant is suitably supplied to the cathode ("air electrode", "oxygen electrode", or "reduction electrode").

Preferably, the hydrogen supplied to the anode is dissociated into hydrogen ions (protons, $H^+$) and electrons ($e^-$) by a catalyst suitably disposed in the electrode/catalyst layer. The hydrogen ions are suitably transmitted to the cathode through the electrolyte membrane, which is a cation exchange membrane, and the electrons are transmitted to the cathode through the GDL and the bipolar plate.

At the cathode, the hydrogen ions supplied through the electrolyte membrane and the electrons transmitted through the bipolar plate react with the oxygen containing air supplied to the cathode to produce water. Migration of the hydrogen ions causes electrons to flow through an external conducting wire, which generates electricity and heat.

Because the PEMFC used in a fuel cell vehicle requires water which serves as a transport medium for hydrogen ions (protons, $H^+$) in the fuel cell system, the humidity of reactant gases is directly related to the fuel cell performance. Accordingly, the air (oxygen) as an oxidant supplied to the cathode of the fuel cell stack is suitably humidified at the air inlet using a humidifier.

Although there are various suitable humidification methods such as bubbler, steam injection, and adsorption, a membrane humidifier having a relatively small volume is widely employed in the fuel cell vehicle due to the limitation in terms of package. The membrane humidifier has a considerable advantage because it does not require any power, and further it has an advantage in its package. The membrane humidifier is configured such that the gas supplied to the cathode inlet receives heat and water from hot and humid gas discharged from the cathode outlet.

Accordingly, a need remains in the art to provide a fuel cell system that does not have deterioration in humidification performance for air as an oxidant, and does not have a deterioration in performance of a fuel cell stack, and an increase in the amount of heat generated from the fuel cell stack, which are caused when the fuel cell stack operates at high temperature and high power.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a fuel cell system including a fuel cell stack for suitably receiving reactant gases and generating electrical energy and a humidifier for humidifying reactant gas that is suitably supplied to a cathode inlet of the fuel cell stack using exhaust gas discharged from a cathode outlet of the fuel cell stack as a water supply source, characterized in that an intercooler for cooling the exhaust gas as a water supply source of the humidifier is preferably installed in an exhaust gas pipe, which suitably connects the cathode outlet of the fuel cell stack and the humidifier, to suitably reduce the temperature of the exhaust gas and, at the same time, suitably increase the humidity thereof, thus improving humidification performance of the humidifier.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: air blower | 20: humidifier |
| 30: fuel cell stack | 40: intercooler |
| 41a, 41b: temperature sensor | 42: controller |
| 43: coolant cut-off device | 44: cut-off valve |
| 45: supply amount control device | 46: opening degree control valve |
| 47: bypass device | 48: bypass pipe |
| 49: bypass valve | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a fuel cell system comprising a fuel cell stack, a humidifier for humidifying reactant gas supplied to a cathode inlet of the fuel cell stack using exhaust gas discharged from a cathode outlet of the fuel cell stack as a water supply source.

In one embodiment, the fuel cell stack is used for receiving reactant gases and generating electrical energy.

In another embodiment, the humidifier for humidifying reactant gas supplied to a cathode inlet of the fuel cell stack is further characterized in that an intercooler for cooling the exhaust gas as a water supply source of the humidifier is installed in an exhaust gas pipe, which connects the cathode outlet of the fuel cell stack and the humidifier, to reduce the temperature of the exhaust gas and, at the same time, increase the humidity thereof, thus improving humidification performance of the humidifier.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention is directed, in part, to decreasing deterioration in humidification performance for air as an oxidant, deterioration in performance of a fuel cell stack, and an increase in the amount of heat generated from the fuel cell stack, which are caused when the fuel cell stack operates at high temperature and high power. Accordingly, the present invention provides, in certain preferred embodiments, a technique for improving humidification performance for air as an oxidant supplied to the fuel cell stack, i.e., air passing through a humidifier by an air blower and supplied to a cathode inlet and thus for improving the performance of the fuel cell stack.

In particular, the present invention can be effectively applied to a system in which a gas-to-gas membrane humidifier is suitably employed to humidify the air supplied to the fuel cell stack. Accordingly, the present invention increases the humidity of exhaust gas used as a water supply source of the membrane humidifier by suitably controlling the temperature of the exhaust gas discharged from a cathode outlet of the fuel cell stack to the membrane humidifier, and thus suitably improves the humidification performance for the air supplied to a cathode inlet of the fuel cell stack.

Figure 1:
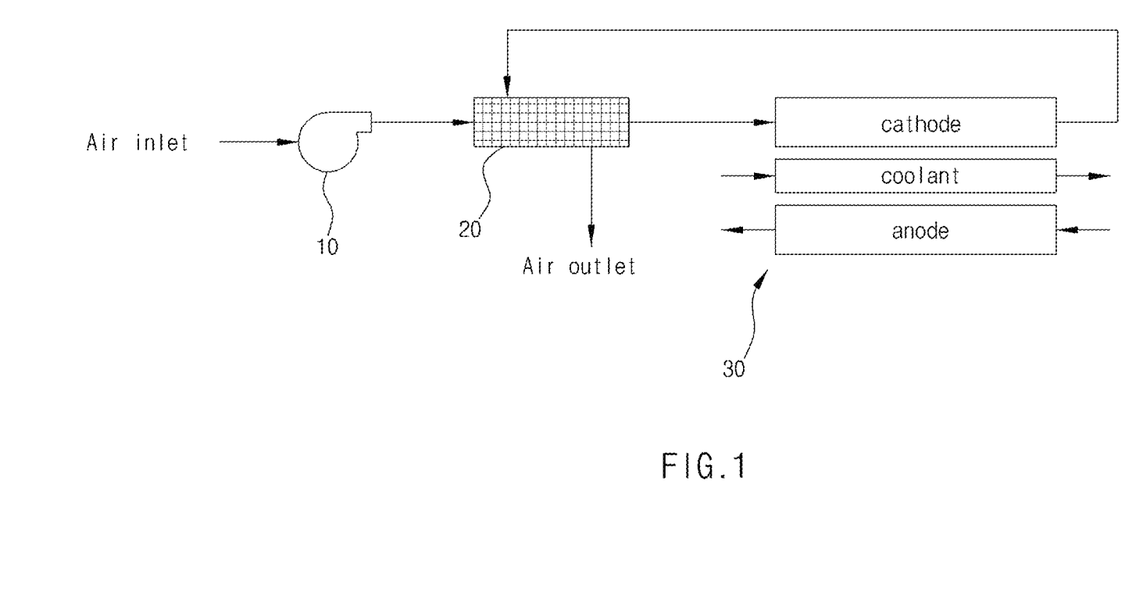
FIG. 1 is a schematic diagram showing an exemplary fuel cell system.

FIG. 1 is a schematic diagram showing a fuel cell humidification system which humidifies air using the above-described membrane humidifier and supplies humidified air to the fuel cell stack. As shown in the figure, external dry air is forcibly supplied into a membrane humidifier 20 by an air blower 10 and, at this time, oversaturated humid air containing water discharged from a cathode outlet of a fuel cell stack 30 is passed through the membrane humidifier 20 such that the dry air is humidified by water exchange between the oversaturated humid air and the dry air. The humidified air is supplied to the fuel cell stack 30.

In general, the membrane humidifier is a gas-to-gas membrane humidifier using hollow fiber membranes. In the membrane humidifier, the hollow fiber membranes having a high contact surface area can be highly integrated, and thus it is possible to provide sufficient humidification to the fuel cell stack with a small capacity. Further, since the water and heat contained in the gas discharged from the cathode outlet of the fuel cell stack through the membrane humidifier are collected and reused, it is possible to save water and energy consumed for the humidification.

However, when employing the PEMFC, in which the humidification is performed by the simple water exchange between gas and gas using the membrane humidifier without any supply of water or energy, when the outside temperature at which the fuel cell operates is high (e.g., more than 40° C.)

and the power at which the fuel cell operates is also high, the temperature of the gas discharged from the cathode outlet is rapidly increased due to the limited heat dissipation performance of the vehicle, which reduces the humidity of the gas, thus deteriorating the humidification performance of the humidifier. As a result, the humidity of the air supplied to the cathode inlet through the membrane humidifier is reduced to deteriorate the fuel cell performance, and thus the heat generated in the fuel cell increases.

As shown in FIG. 1, the gas (air) as an oxidant supplied to the fuel cell stack through the gas-to-gas membrane humidifier receives water and heat from the exhaust gas discharged from the cathode outlet to become hot and humid and is then supplied to the cathode inlet.

When the fuel cell stack operates at high temperature and high power, the amount of heat generated from the fuel cell stack increases, and thus the temperature difference between coolant inlet and outlet increases, which results in an increase in the temperature of the exhaust gas discharged from the cathode outlet. In this case, the saturated vapor pressure also increases to reduce the humidity.

Accordingly, when the humidity of the cathode exhaust gas as a water supply source of the humidifier is reduced, the amount of water transmitted through the gas-to-gas membrane humidifier is also reduced, thus reducing the humidity of the gas supplied to the cathode inlet. When the humidity of the gas supplied to the cathode is reduced, the amount of water supplied is also reduced to deteriorate the fuel cell stack performance, which leads to an increase in the amount of heat generated.

Accordingly, there have been many attempts to improve the heat dissipation performance of the fuel cell system; however, it is impossible to unlimitedly increase the size of a radiator due to the packaging problem. And, in the case where the fan capacity of the radiator is increased, the amount of energy consumed by balance of plant (BOP) components is also increased, thus reducing the efficiency of the system.

Figure 2:
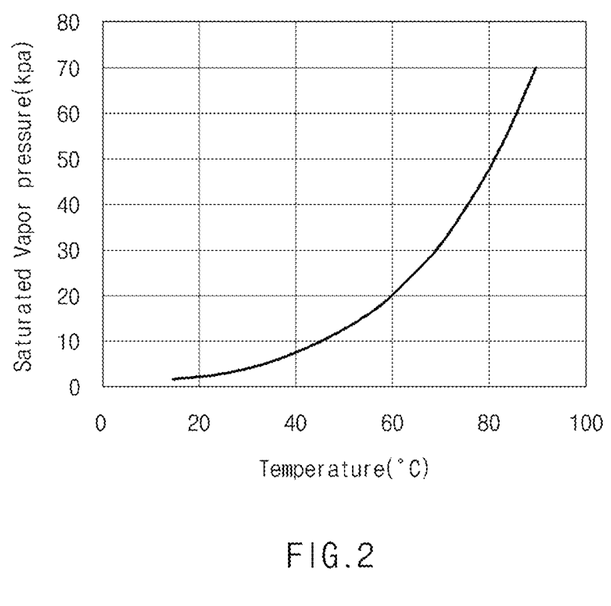
FIG. 2 is a graph showing a saturated vapor pressure curve.

FIG. 2 is a graph showing a saturated vapor pressure curve, from which it can be seen that the saturated vapor pressure increases in geometric progression as the temperature of gas increases. That is, the higher the temperature of the gas, the more the amount of water required to maintain the same humidity increases.

Figure 3:
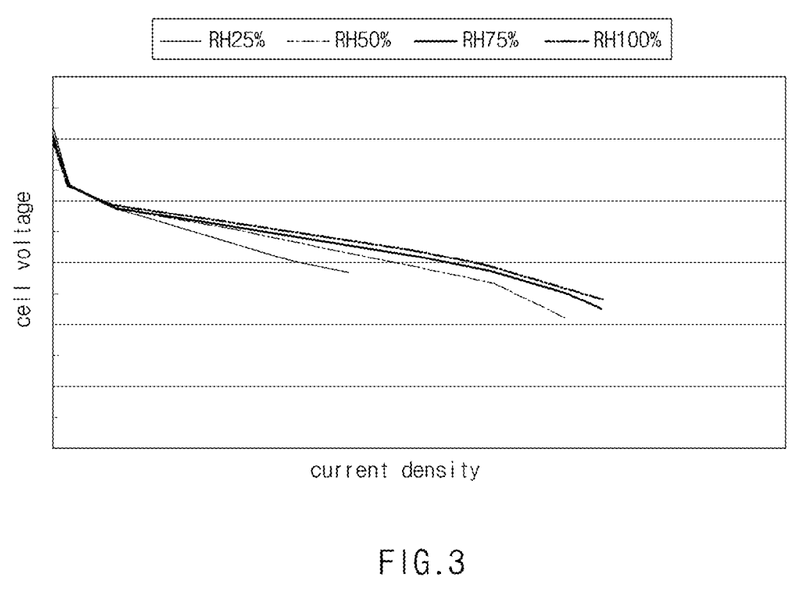
FIG. 3 is a graph showing a change in performance of a fuel cell stack with respect to a change in humidity of reactant gas.

FIG. 3 is a graph showing a change in the performance of the fuel cell stack with respect to a change in the humidity of the gas supplied to the cathode inlet, from which it can be seen that the lower the humidity of the reactant gas, the more the fuel cell stack performance deteriorates.

In preferred embodiments of the present invention, an intercooler is provided between the cathode outlet of the fuel cell stack and the membrane humidifier to suitably control the temperature of the exhaust gas discharged from the cathode outlet of the fuel cell stack to the membrane humidifier. As a result, the temperature of the exhaust gas is suitably reduced to increase the humidity thereof, and thus it is possible to suitably improve the humidification performance for air, suitably improve the fuel cell stack performance, and suitably reduce the amount of heat generated from the fuel cell stack.

In further preferred embodiments, the present invention preferably includes a device for preventing water in a pipe from being condensed due to unnecessary cooling of exhaust gas by suitably limiting the cooling of exhaust gas performed by the intercooler to high-temperature and high-power operation.

Figure 4:
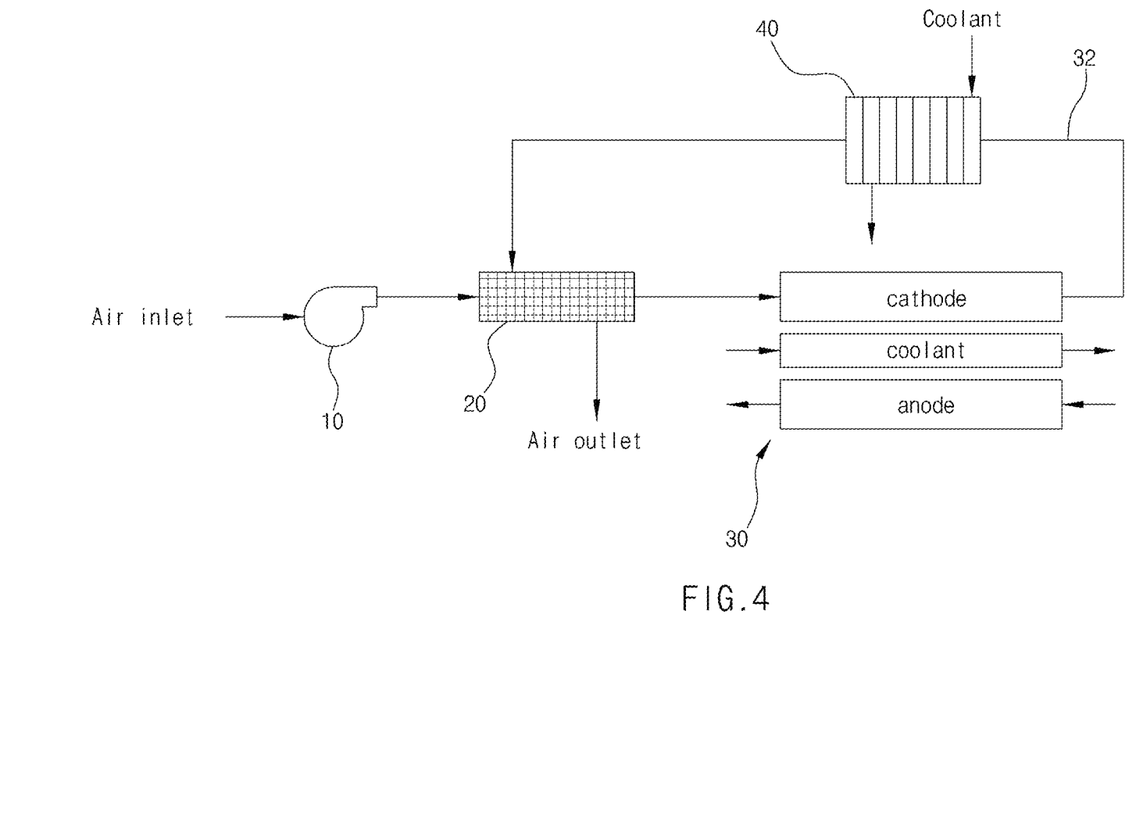
FIG. 4 is a schematic diagram showing the configuration of a fuel cell system in accordance with preferred embodiments of the present invention.

FIG. 4 is a schematic diagram showing the configuration of a fuel cell system in accordance with certain preferred embodiments of the present invention. Preferably, and as shown in the figure, an intercooler 40 is suitably provided in the middle of a pipe connecting a cathode outlet of a fuel cell stack 30 and a humidifier 20.

For example, in certain exemplary embodiments, the humidifier 20 may be a membrane humidifier using hollow fiber membranes, in which the humidification is suitably performed by water exchange between gas and gas.

Accordingly, the exhaust gas discharged from the cathode outlet of the fuel cell stack 30 moves along a pipe (hereinafter referred to as an exhaust gas pipe) 32, passes through the intercooler 40, and is then supplied to the membrane humidifier 20. The exhaust gas discharged from the membrane humidifier 20 is used as a water supply source to suitably exchange water with dry air supplied by the air blower 10.

In further preferred embodiments of the present invention, the exhaust gas passing through the intercooler 40 is heat-exchanged with coolant (such as air and cooling water) passing through the intercooler 40 and, at this time, the heat of the exhaust gas is transferred to the coolant and thus is suitably cooled. The exhaust gas cooled in the intercooler 40 is suitably discharged along the exhaust gas pipe 32 and supplied to the membrane humidifier 20.

Preferably, when the temperature of the exhaust gas discharged from the cathode outlet of the fuel cell stack 30 through the intercooler 40 is suitably reduced, it is possible to increase the relative humidity of the exhaust gas even with the same amount of vapor.

Figure 5:
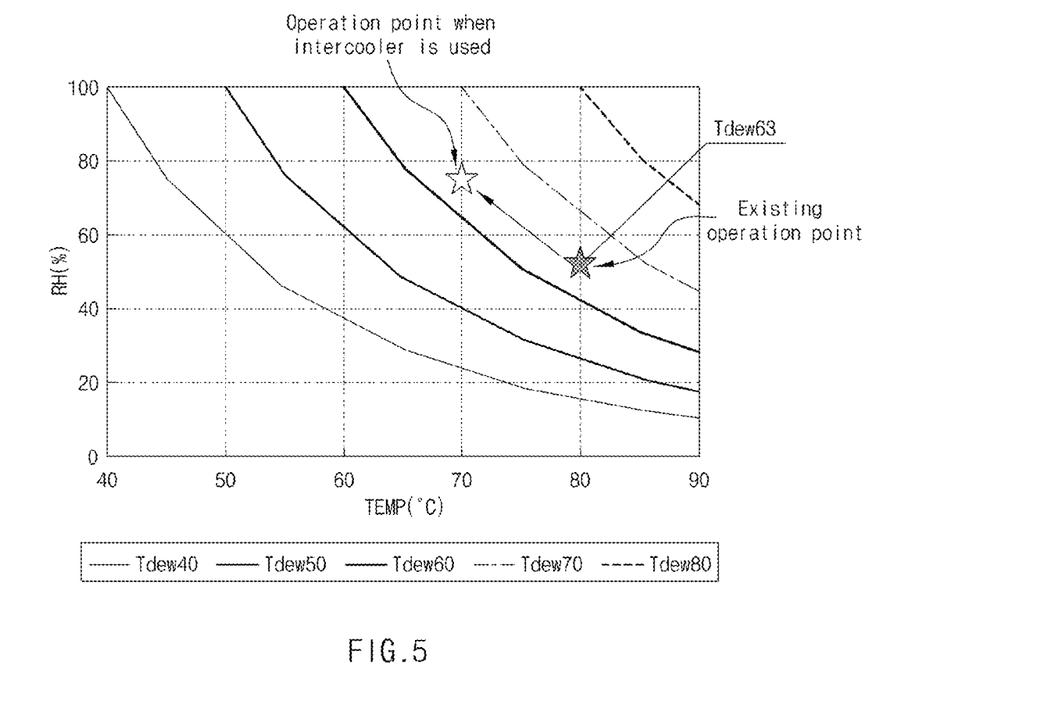
FIG. 5 is a graph showing a change in relative humidity with respect to a change in temperature at the same dew point.

FIG. 5 is a graph showing a change in relative humidity with respect to a change in temperature at the same dew point according to certain exemplary embodiments of the present invention. As shown in the figure, even when the temperature of air at 80° C. having a dew point of 63° C. is reduced by 10° C. to 70° C., it is possible to suitably increase the relative humidity from 50% to more than 70%.

Since the gas has a low heat capacity, it is possible to suitably cool the gas with a lower energy, instead of cooling the entire fuel cell stack, and thus it is possible to easily control the temperature even with a small intercooler.

According to further preferred embodiments, when the humidity of the exhaust gas as a water supply source discharged from the cathode outlet of the fuel cell stack 30 through the intercooler 40 is suitably increased, the humidification performance of the membrane humidifier 20 is improved. Preferably, water is more effectively transferred to the gas (air) as an oxidant supplied to the cathode inlet of the fuel cell stack 30 (i.e., the amount of water exchanged increases), which results in an increase in the humidity of the reactant gas, thus suitably improving the performance of the fuel cell stack 30 and, at the same time, suitably reducing the amount of heat generated from the fuel cell stack 30.

Figure 6:
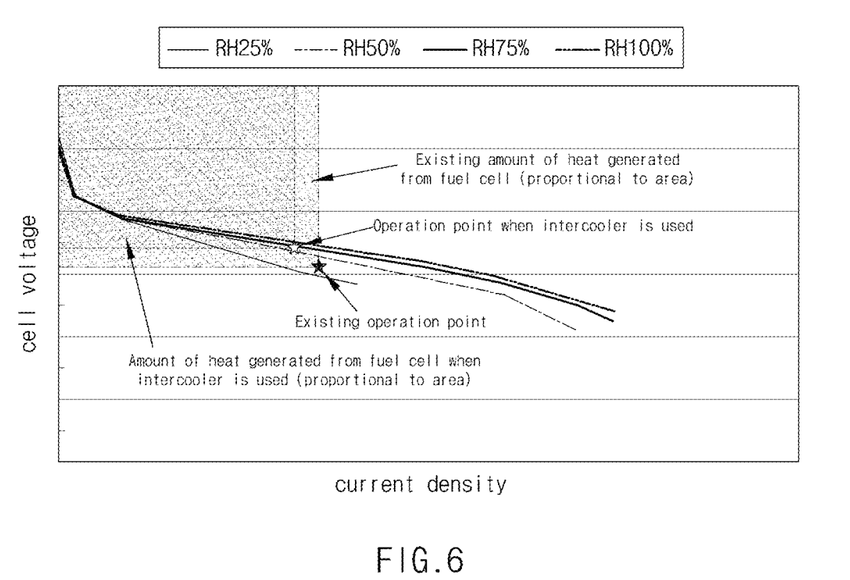
FIG. 6 is a graph showing a change in operation point with respect to a change in humidity of reactant gas at the same power.

FIG. 6 is a graph showing a change in operation point with respect to a change in humidity of reactant gas at the same power according to further exemplary embodiments of the present invention. As shown in the figure, when the humidity of the exhaust gas is increased by the intercooler and the humidity of the gas passing through the membrane humidifier and supplied to the fuel cell stack is increased, the performance of the fuel cell stack is suitably improved, and thus it is possible to provide the same power even at a lower current. As a result, the amount of heat generated from the fuel cell stack is suitably reduced, thus it is possible to easily configure the cooling system of the fuel cell stack.

Accordingly, the technique provided by the present invention, in which the humidity of the exhaust gas is suitably increased by reducing the temperature of the exhaust gas as a water supply source of the membrane humidifier and the humidification performance of the humidifier is suitably improved to increase the humidity of the reactant gas, thus improving the performance of the fuel cell stack and, at the same time, reducing the amount of heat generated from the fuel cell stack, has differences in terms of the objectives and effects compared to the conventional technique of controlling the temperature of the reactant gas (such as air as an oxidant).

A technique of controlling the temperature of the reactant gases such as hydrogen as a fuel or air as an oxidant supplied to the fuel cell stack has been proposed by providing a heating means or a heat-exchange means in the fuel cell system.

Preferably, the heating means or heat-exchange means is suitably disposed in a path through which the reactant gas is supplied to the fuel cells stack, such as the cathode inlet of the fuel cell stack or the humidifier inlet, to control the temperature of the reactant gas. Accordingly, in further preferred embodiments, the heating means or heat-exchange means may preferably be used to reduce the temperature of compressed air, for example, and supply the cooled air to the fuel cell stack.

The above-described heating means or heat-exchange means has clear differences in terms of the objective of installation, the position of installation, and its effect compared to those of the intercooler of the present invention installed between the cathode outlet of the fuel cell stack and the humidifier.

According to preferred embodiments of the present invention, it is necessary to note that the intercooler 40 of the present invention is a technique for improving the humidification performance, when the fuel cell stack 30 operates at high temperature and high power, by suitably reducing the temperature of the exhaust gas discharged from the fuel cell stack 30 to the humidifier 20 to suitably increase the humidity thereof and thus to increase the humidity of air as an oxidant in the humidifier 20. Accordingly, the present invention can solve the conventional problem wherein an increase in the amount of heat generated from the fuel cell stack leads to an increase in the temperature difference between the coolant inlet and outlet which leads to an increase in the temperature of the exhaust gas from the cathode outlet which leads to an increase in the saturated vapor pressure of the exhaust gas which leads to a decrease in the humidity of the exhaust gas which leads to a deterioration in humidification performance for reactant gas which leads to a deterioration in performance of the fuel cell stack due to a reduction in the amount of water supplied, which are caused when the fuel cell stack operates at high temperature and high power.

Accordingly, in the case where there is no need to use the intercooler 40 due to a suitably low temperature of the exhaust gas discharged from the cathode outlet of the fuel cell stack 30 as the power of the fuel cell stack or the outside temperature is low, if the temperature of the exhaust gas is unnecessarily reduced by the intercooler 40, the water may be condensed in the intercooler 40.

In certain preferred embodiments, the resistance applied to the exhaust gas passing through the intercooler is suitably increased to increase the back pressure of the intercooler, and thus the energy consumed by the air blower may increase. Preferably, in the winter season, the condensed water may freeze during or after the operation of the fuel cell system, thus causing a serious problem.

Preferably, the use of the intercooler is limited to high-temperature and high-power operation of the fuel cell, and thus auxiliary devices are suitably provided in addition to the intercooler in the present invention. The auxiliary devices perform the functions such as supply or cut-off of the coolant as a heat-exchange medium for reducing the temperature of the exhaust gas, control of the amount of coolant supplied, and bypass control to prevent the exhaust gas from passing through the intercooler.

In preferred embodiments of the present invention, an air-cooling type intercooler using external air as a coolant for reducing the temperature of the exhaust gas or water-cooling type intercooler using coolant may be suitably employed. Basically, only when the coolant is supplied to the intercooler, it is possible to control the temperature of the exhaust gas through the heat exchange.

Accordingly, when the intercooler is not used, it is possible to cut off the coolant supplied to the intercooler or it is possible to prevent the exhaust gas from passing through the intercooler. Further, in particular preferred embodiments, it is possible to control the humidity of the exhaust gas, the amount of water supplied to the reactant gas, and the amount of heat generated from the fuel cell stack by suitably controlling the temperature of the exhaust gas based on the operation state of the fuel cell stack. Accordingly, the present invention preferably provides the following system configured to provide the above-described functions.

Figure 7:
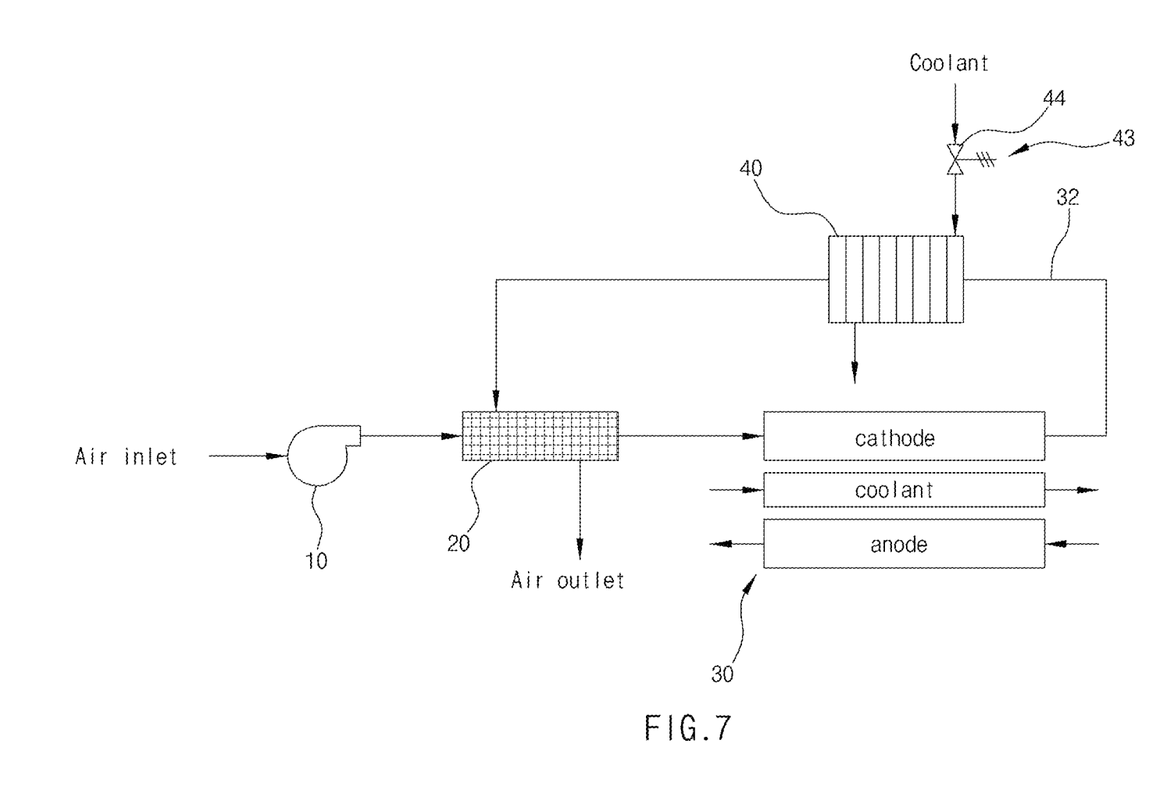
FIG. 7 is a schematic diagram showing the configuration of a coolant cut-off device in accordance with preferred embodiments of the present invention.
Figure 8:
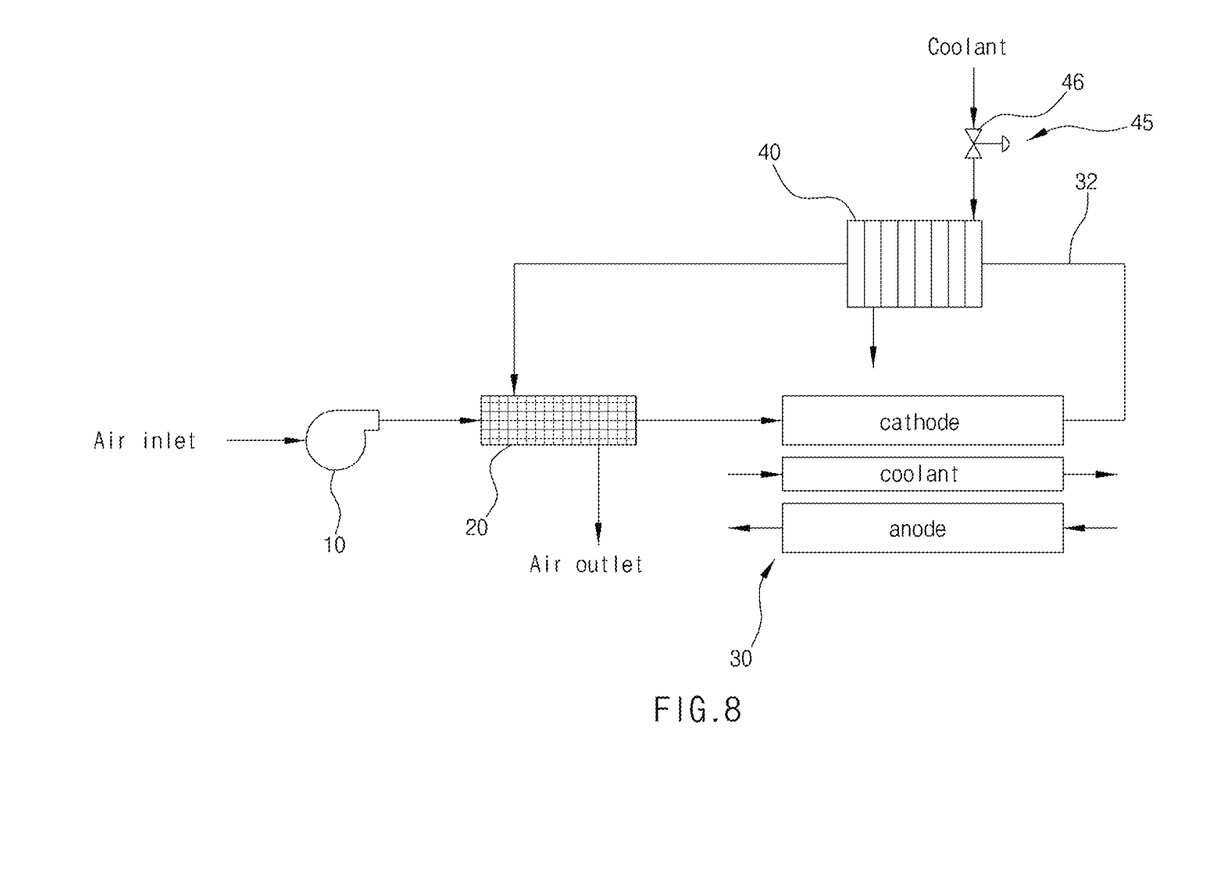
FIG. 8 is a schematic diagram showing the configuration of a supply amount control device in accordance with preferred embodiments of the present invention.

FIG. 7 is a schematic diagram showing the configuration of a coolant cut-off device for selectively supplying and cutting off the coolant to the intercooler based on the operation state of the fuel cell stack according to preferred embodiments of the present invention. FIG. 8 is a schematic diagram showing the configuration of a supply amount control device for controlling the amount of coolant supplied to the intercooler to provide a more precise control based on the operation state of the fuel cell stack according to preferred embodiments of the present invention.

A cut-off valve 44 capable of simply supplying and cutting-off the coolant is shown in FIG. 7 as a constituent element of a coolant cut-off device 43, and an opening degree control valve 46 capable of controlling the opening degree of a supply path is shown in FIG. 8 as a constituent element of a supply amount control device 45.

According to certain preferred embodiments, the cut-off valve 44 and the opening degree control valve 46 are suitably installed in a path through which the coolant is supplied to the intercooler 40.

In certain preferred embodiments where the air-cooling type intercooler using external air as a coolant is suitably employed, the coolant cut-off device 43 may be a valve or door capable of selectively supplying and cutting off the external air, and the supply amount control device 45 may be a valve or door capable of gradually controlling the opening degree of an air path.

Figure 9:
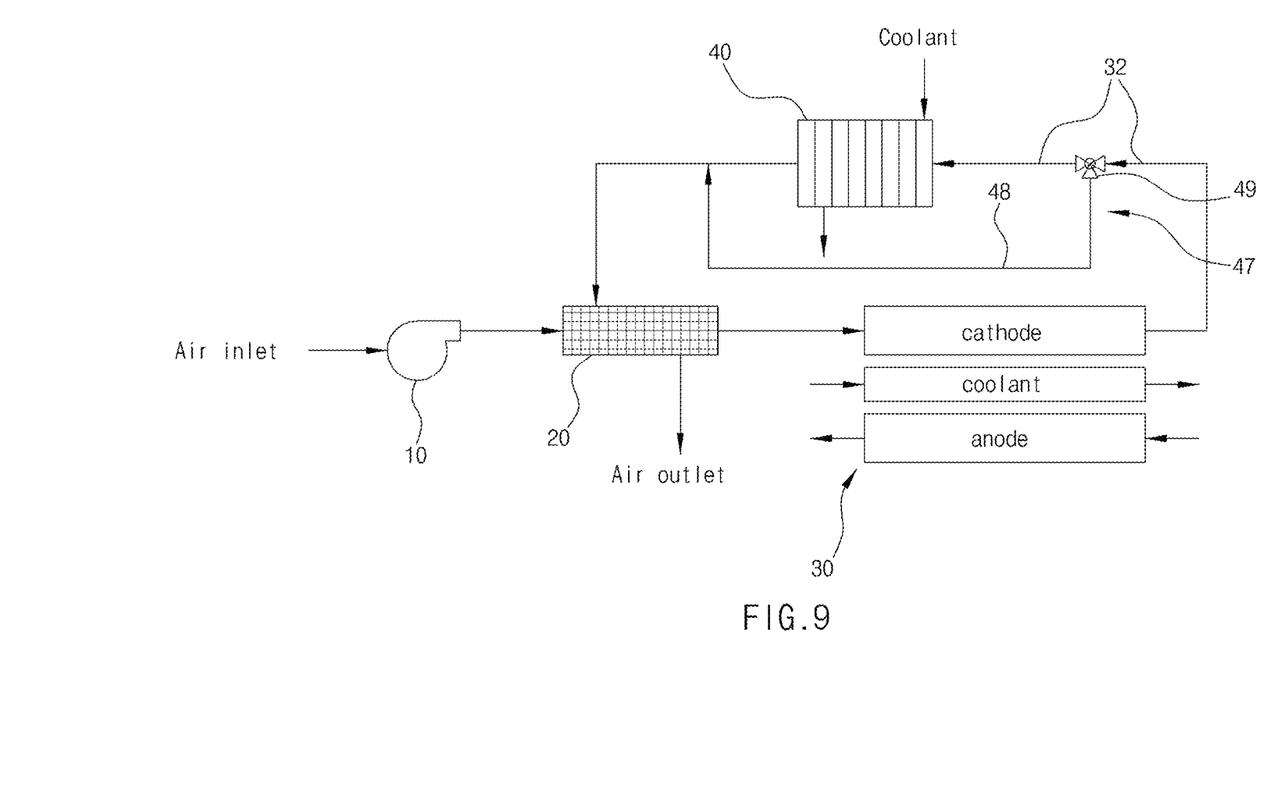
FIG. 9 is a schematic diagram showing the configuration of a bypass device in accordance with preferred embodiments of the present invention.

FIG. 9 is a schematic diagram showing the configuration of a bypass device in accordance with further preferred embodiments of the present invention. In order not to use the intercooler 40, a bypass device 47 may preferably be provided to prevent the exhaust gas from passing through the intercooler 40, instead of using the device for controlling the coolant supplied to the intercooler 40.

According to certain preferred embodiments and as shown in FIG. 9, a bypass pipe 48 for suitably bypassing the exhaust gas from the fuel cell stack 30 to the humidifier 20 is installed in the exhaust gas pipe 32 such that the exhaust does not pass through the intercooler 40, and a bypass valve 49 for controlling the flow direction of the exhaust gas is suitably installed such that the exhaust gas may selectively pass through either the intercooler 40 or the bypass pipe 48.

As illustrated, in certain preferred embodiments, the bypass valve 49 may be a three-way valve installed at an inlet of the bypass pipe 48, branched off from the exhaust gas pipe 32, and controlling the flow direction of the exhaust gas.

Accordingly, with the use of the bypass pipe 48 for suitably bypassing the exhaust gas and the bypass valve 49 for suitably controlling the flow direction of the exhaust gas, the exhaust gas can pass through the bypass pipe 48 when there is no need to cool the exhaust gas, and thus it is possible to suitably minimize the loss of pressure caused when its passes through the intercooler, and thus to improve the system efficiency.

According to preferred embodiments and as described herein, the bypass valve 49 is configured to select the flow direction of the exhaust gas from either the path passing through the intercooler 40 or the path passing through the bypass pipe 48; however, it is possible to flow the exhaust gas in both directions by suitably controlling the flow amount of the exhaust gas. Accordingly, all or a part of the exhaust gas may be bypassed. In further preferred embodiments, for example in the case where a part of the exhaust gas is bypassed, the amount of exhaust gas flowing in each direction is appropriately distributed by suitably controlling the opening degree of the bypass valve 49 based on the operation state of the fuel cell stack 30. Preferably, the bypass valve 49 suitably controls the amount of exhaust gas passing through the respective flow paths by controlling the opening degrees of the flow paths (control of the amount of bypass flow).

Further, in the present invention, the bypass device may be suitably applied to either the coolant cut-off device or the supply amount control device.

According to further preferred embodiments, each of the coolant cut-off device 43, the supply amount control device 45, and the bypass device 47 includes an operation state detector 41a or 41b for detecting an operation state of the fuel cell stack 30 and a controller 42 for controlling the cut-off valve 44, the opening degree control valve 46, and the bypass valve 49 based the operation state of the fuel cell stack 30 detected by the operation state detector 41a or 42b.

Figure 10:
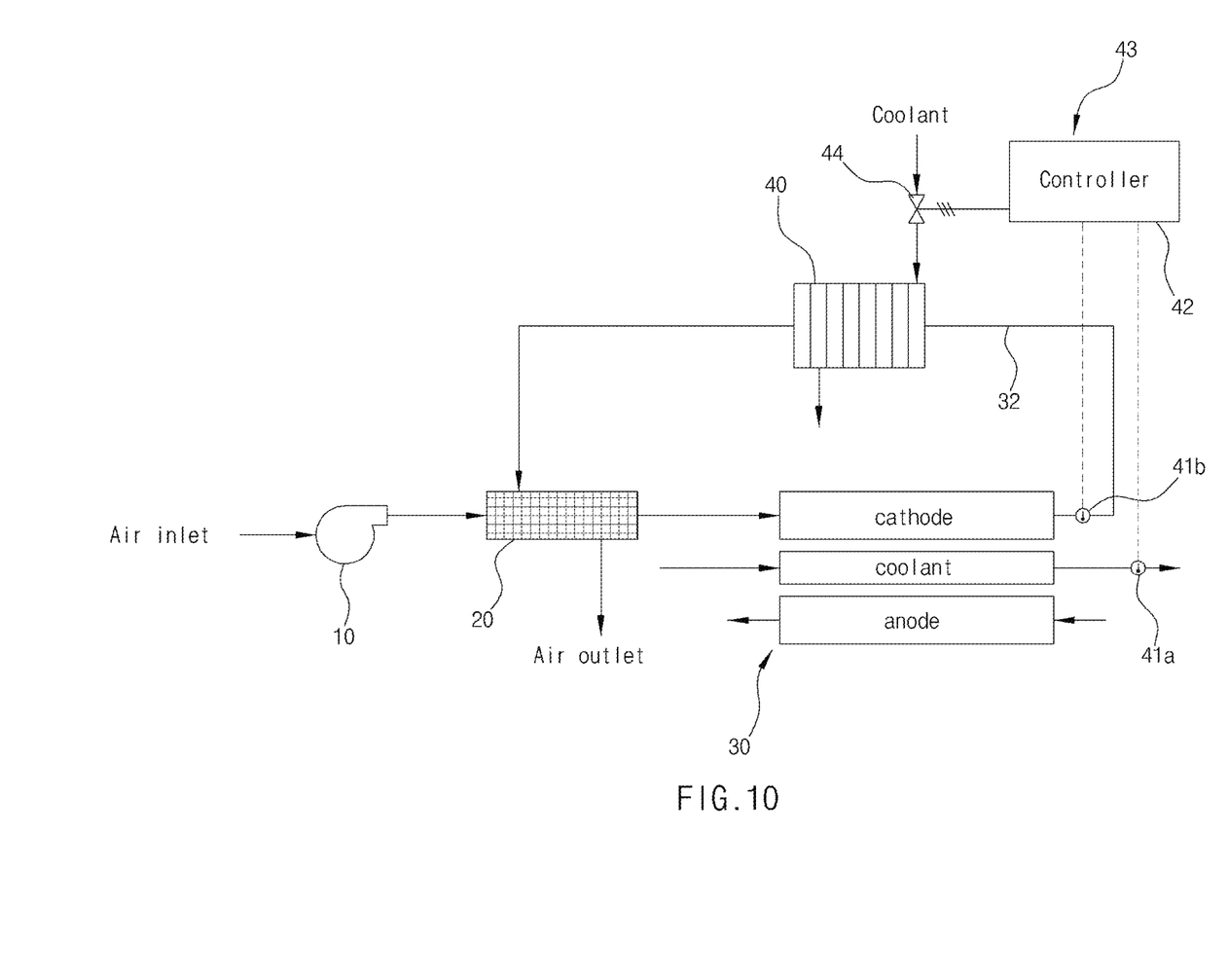
FIG. 10 is a schematic diagram showing the configuration of an operation state detector and a controller of the coolant cut-off device in accordance with preferred embodiments of the present invention.
Figure 11:
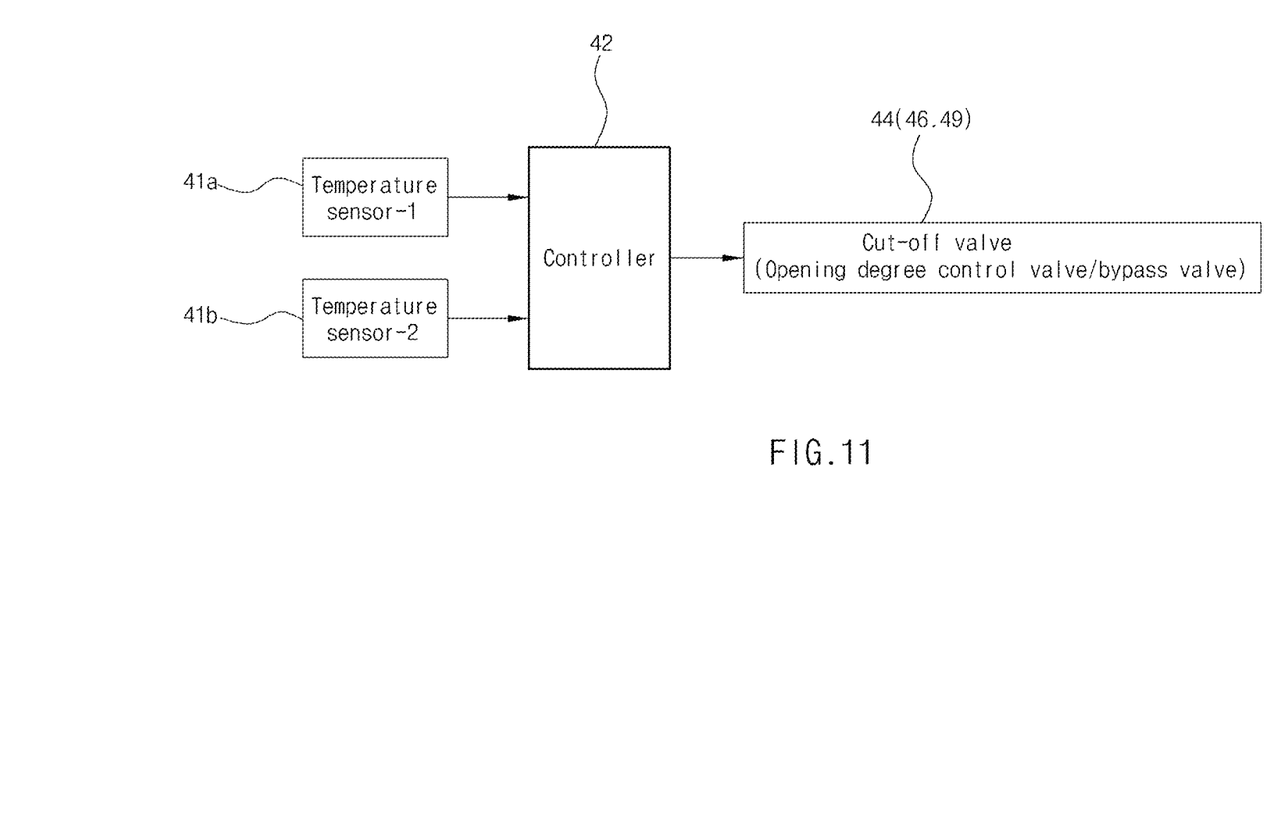
FIG. 11 is a schematic diagram showing a control signal flow of the coolant cut-off device (supply amount control device/bypass device) in accordance with preferred embodiments of the present invention.

FIG. 10 is a schematic diagram showing the configuration of an operation state detector and a controller of the coolant cut-off device in accordance with preferred embodiments of the present invention, and FIG. 11 is a schematic diagram showing a control signal flow of the coolant cut-off device. Preferably, the operation state detector and the controller may be suitably employed in each of the supply amount control device and the bypass device in the same manner as the coolant cut-off device.

In certain preferred embodiments, the operation state detector may be a temperature sensor 41a for suitably detecting the temperature of the coolant discharged from the fuel cell stack 30 or a temperature sensor 41b for suitably detecting the temperature of the exhaust gas discharged from the fuel cell stack 30. Preferably, the coolant temperature sensor 41a may be installed at the coolant outlet of the fuel cell stack 30, and the exhaust gas temperature sensor 41b may be suitably installed at the cathode outlet of the fuel cell stack 30.

According to certain preferred embodiments of the invention, the temperature of the coolant passing through the fuel cell stack 30 or that of the exhaust gas discharged from the furl cell stack 30 is suitably increased when the temperature and power of the fuel cell stack 30 are higher. Accordingly, it is possible to determine the operation state of the fuel cell stack 30 based on the temperature of coolant or exhaust gas.

In further preferred embodiments of the present invention, a detection value output from the temperature sensor 41a or 41b is input to the controller 42 and, if the detection value of the temperature sensor 41a or 41b is less than a predetermined reference value, the controller 42 determines that it is not necessary to cool the exhaust gas using the intercooler 40 and outputs a control signal for cutting off the supply of the coolant. Preferably, in further embodiments, the cut-off valve 44 is closed to cut off the supply of the coolant such that the intercooler 40 is not used.

Preferably, if the detection value of the temperature sensor 41a or 41b exceeds the reference value, the cut-off valve 44 is opened to supply the coolant to the intercooler 40, and thus the intercooler 40 suitably reduces the temperature of the exhaust gas.

In other further embodiments, in order not to use the intercooler 40, the controller 42 outputs a suitably control signal for bypassing the exhaust gas through the bypass pipe 48, and thus the exhaust gas does not pass through the intercooler 40 but is bypassed to the membrane humidifier 20. Accordingly, the controller 42 controls the bypass valve (three-way valve) 49 such that the exhaust gas pipe 32 connecting to the intercooler 40 is cut off and the bypass pipe 48 is opened.

Further, if the detection value of the temperature sensor 41a or 41b exceeds the reference value, the exhaust gas pipe 32 is opened by the bypass valve 49 and the bypass pipe 48 is cut off such that the exhaust gas passes through the intercooler 40. Accordingly, in further preferred embodiments, the temperature of the exhaust gas supplied to the membrane humidifier 20 is suitably reduced and, at the same time, the humidity thereof is increased.

Preferably, the controller 42 may control the opening degree of the bypass valve 49 based on the detection value of the temperature sensor 41a or 41b. Accordingly, it is possible to appropriately distribute the amount of exhaust gas passing through the intercooler 40 and the amount of exhaust gas bypassed by controlling the valve opening degree.

Preferably, since the fuel cell stack 30 operates at high temperature and high power if the detection value of the temperature sensor 41a or 41b is high, the opening degree of the exhaust gas pipe 32 is gradually increased to increase the amount of exhaust gas passing through the intercooler 40, thus suitably reducing the temperature of the exhaust gas to a desired value and, at the same time, suitably increasing the humidity thereof.

Further, according to other preferred embodiments, in the case where the supply amount control device 45 for controlling the amount of coolant supplied to the intercooler 40 is provided, the controller 42 outputs a control signal for controlling the amount of coolant supplied to the intercooler 40 based on the detection value of the temperature sensor 41a or 41b such that the amount of coolant supplied to the intercooler 40 can be controlled based on the operation state of the fuel cell stack 30. Preferably, the opening degree control valve 46 is controlled to control the opening degree of the coolant flow path.

Preferably, in certain exemplary embodiments, since the fuel cell stack 30 operates at high temperature and high power if the detection value of the temperature sensor 41a or 41b is high, the opening degree is gradually increased to increase the amount of coolant supplied, thus reducing the temperature of the exhaust gas to a desired value and, at the same time, increasing the humidity thereof.

As described herein, according to the fuel cell system of the present invention, the intercooler suitably reduces the temperature of the exhaust gas discharged from the fuel cell stack and suitably increases the humidity thereof when the fuel cell stack operates at high temperature and high power, thus increasing the humidity of the reactant gas as an oxidant in the humidifier.

In further preferred embodiments, due to the improvement in the humidification performance for the reactant gas as an oxidant, it is possible to suitably improve the fuel cell stack performance and solve the problems such as a deterioration in the humidification performance for the reactant gas as an oxidant, a deterioration in the performance of the fuel cell stack, and an increase in the amount of heat generated from the fuel cell stack, which are caused when the fuel cell stack operates at high temperature and high power.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell system, comprising:
   a fuel cell stack that receives reactant gases and generate electrical energy;
   a humidifier to humidify reactant gas supplied to a cathode inlet of the fuel cell stack using exhaust gas discharged from a cathode outlet of the fuel cell stack as a water supply source;
   an intercooler to cool the exhaust gas as a water supply source of the humidifier, wherein the intercooler is installed in an exhaust gas pipe, which connects the cathode outlet of the fuel cell stack and the humidifier, to reduce the temperature of the exhaust gas and, simultaneously, increase the humidity thereof, to improve humidification performance of the humidifier and wherein the humidifier is installed in a pipe connecting the intercooler and the cathode inlet;
   a coolant cut-off device to selectively supply and cut off coolant to the intercooler, which is heat-exchanged with the exhaust gas within the intercooler, to the intercooler based on an operation state of the fuel cell stack, wherein the coolant cut-off device includes:
      an operation state detector configured to detect an operation state of the fuel cell system;
      a controller configured to output a control signal to selectively supply and cut off the coolant based on the operation state of the fuel cell stack detected by the operation state detector; and
      a cut-off valve installed in a path through which the coolant is supplied to the intercooler, wherein the cut-off valve is configured to selectively supply and cut off the coolant to the intercooler based on the control signal of the controller; and
   a bypass device that bypasses all or a part of the exhaust gas discharged from the fuel cell stack from the exhaust gas pipe to the humidifier based on the operation state of the fuel cell stack such that the exhaust gas does not pass through the intercooler,
   wherein the bypass device includes: a bypass pipe installed in the exhaust gas pipe and installed to bypass the exhaust gas to control passage of exhaust gas through the intercooler; and a bypass valve that controls the flow of exhaust gas in the path between the intercooler and the bypass pipe based on the control signal of the controller.

2. The fuel cells system of claim 1, wherein the operation state detector is a temperature sensor installed at a coolant outlet of the fuel cell stack and configured to detect the temperature of the coolant passing through the fuel cell stack and configured to detect the temperature of the coolant passing through the fuel cell stack or a temperature sensor installed at the cathode outlet of the fuel cell stack and configured to detect the temperature of the exhaust gas, and the controller determines that the fuel cell stack operates at high temperature and high power only when a detection value of the temperature sensor exceeds a predetermined reference value and outputs a control signal to supply the coolant.

3. The fuel cell system of claim 1, further comprising a supply amount control device configured to control the amount of coolant supplied to the intercooler and heat-exchanged with the exhaust gas based on the operation state of the fuel cell system.

4. The fuel cell system of claim 3, wherein the supply amount control device comprises:
   an operation state detector configured to detect an operation state of the fuel cell system;
   a controller configured to output a control signal to control the amount of coolant supplied based on the operation state of the fuel cell stack detected by the operation state detector; and
   an opening degree control valve installed in a path through which the coolant is supplied to the intercooler and is configured to control the amount of coolant supplied based on the control signal of the controller.

5. The fuel cell system of claim 4, wherein the operation state detector is a temperature sensor installed at the coolant outlet of the fuel cell stack and configured to detect the temperature of the coolant passing through the fuel cell stack or a temperature sensor installed at the cathode outlet of the fuel cell stack and configured to detect the temperature of the exhaust gas, and the controller outputs a control signal to control the amount of coolant supplied based on a detection value of the temperature sensor.

6. The fuel cell system of claim 1, wherein the operation state detector is a temperature sensor installed at the coolant outlet of the fuel cell stack and configured to detect the temperature of the coolant passing through the fuel cell stack or a temperature sensor installed at the cathode outlet of the fuel cell stack and configured to detect the temperature of the exhaust gas, and the controller outputs a control signal to control the amount of exhaust gas bypassed based on a detection value of the temperature sensor.

7. The fuel cell system of claim 6, wherein the controller outputs a control signal that bypasses all exhaust gas through the bypass pipe if the detection value of the temperature sensor is less than a predetermined reference value.

* * * * *